(12) United States Patent
Klafke

(10) Patent No.: US 8,955,783 B2
(45) Date of Patent: Feb. 17, 2015

(54) SAFETY BELT DEVICE

(75) Inventor: Ulrich Klafke, Kirchlinteln (DE)

(73) Assignee: Illinois Tool Works Inc., Glenview, IL (US)

( * ) Notice: Subject to any disclaimer, the term of this patent is extended or adjusted under 35 U.S.C. 154(b) by 75 days.

(21) Appl. No.: 13/257,296

(22) PCT Filed: Mar. 16, 2010

(86) PCT No.: PCT/US2010/027386
§ 371 (c)(1),
(2), (4) Date: Sep. 17, 2011

(87) PCT Pub. No.: WO2010/107728
PCT Pub. Date: Sep. 23, 2010

(65) Prior Publication Data
US 2012/0001009 A1   Jan. 5, 2012

(30) Foreign Application Priority Data

Mar. 18, 2009   (DE) .......................... 10 2009 015 296

(51) Int. Cl.
*B60R 22/34*   (2006.01)
(52) U.S. Cl.
CPC ............. *B60R 22/34* (2013.01); *B60R 22/3413* (2013.01); *B60R 2022/3427* (2013.01)
USPC ............................ 242/376; 242/377; 242/379
(58) Field of Classification Search
CPC ............ B60R 22/3413; B60R 22/4676; B60R 2022/287; B60R 2022/3427; B60R 2022/1818
USPC .......................................... 242/376, 377, 379
See application file for complete search history.

(56) References Cited

U.S. PATENT DOCUMENTS

| | | | | |
|---|---|---|---|---|
| 4,119,281 A | * | 10/1978 | Paitula et al. | 242/376 |
| 4,967,976 A | * | 11/1990 | Kawai et al. | 242/586.2 |
| 5,065,953 A | | 11/1991 | Schmid et al. | |
| 5,630,561 A | * | 5/1997 | Ogawa et al. | 242/376 |
| 5,722,611 A | * | 3/1998 | Schmid et al. | 242/376 |

(Continued)

FOREIGN PATENT DOCUMENTS

| | | |
|---|---|---|
| DE | 2556409 A1 | 6/1977 |
| DE | 4331723 A1 | 3/1995 |

(Continued)

OTHER PUBLICATIONS

ISR for PCT/US2010/027386 dated May 4, 2010.

*Primary Examiner* — Sang Kim
(74) *Attorney, Agent, or Firm* — Lowe Hauptman & Ham LLP

(57) ABSTRACT

The invention relates to a safety belt device, in particular for a motor vehicle, comprising a wind-on spindle which is mounted rotatably in a housing connected to the motor vehicle body and on which a safety belt is held with its one end, the wind-on spindle being prestressed into a wind-on position, in which the safety belt is wound on the wind-on spindle and the safety belt can be unwound from the wind-on spindle, counter to the prestress, as a result of the rotation of the latter, and the safety belt emerging from its end held on the wind-on spindle through an exit orifice out of the wind-on spindle. According to the invention, there is provision whereby, in the state unwound completely from the wind-on spindle, the safety belt runs, between its end held on the wind-on spindle and the exit orifice of the wind-on spindle, in a sheet-like manner over at least one surface.

14 Claims, 5 Drawing Sheets

(56) References Cited

U.S. PATENT DOCUMENTS

Figure 1:
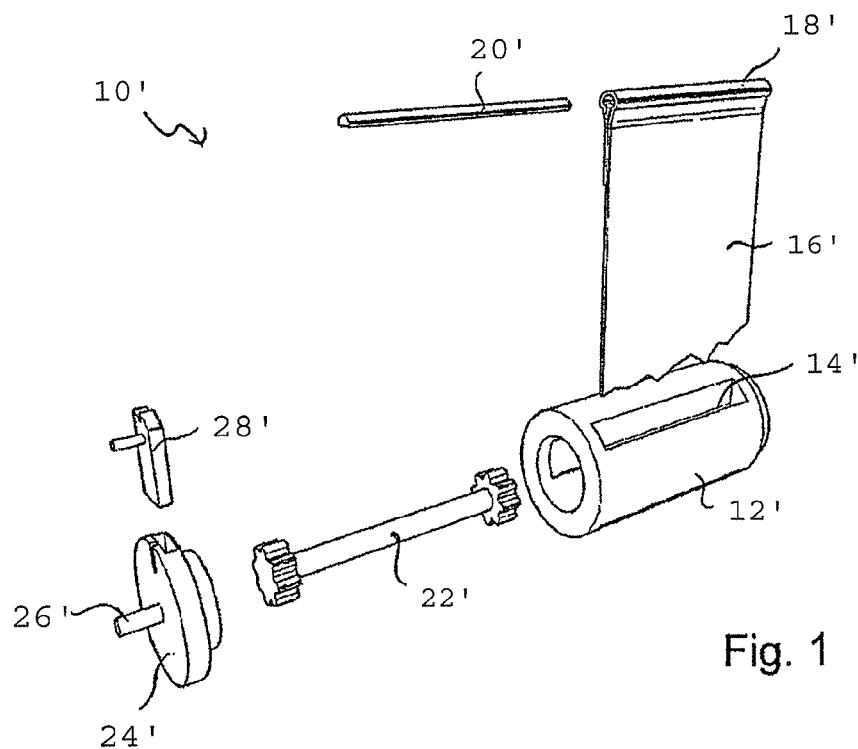

| | | | |
|---|---|---|---|
| 5,984,223 A | 11/1999 | Hiramatsu | |
| 6,336,606 B1 | 1/2002 | Smithson et al. | |
| 6,609,672 B2 * | 8/2003 | Bell et al. | 242/376 |
| 6,732,966 B2 * | 5/2004 | Wier | 242/376 |

FOREIGN PATENT DOCUMENTS

| | | |
|---|---|---|
| DE | 4426479 A1 | 1/1996 |
| DE | 102007008394 B3 | 10/2008 |
| EP | 0402489 A1 | 12/1990 |
| EP | 0962365 A2 | 12/1999 |
| GB | 1528785 A | 10/1978 |
| GB | 2354208 A | 3/2001 |
| JP | 08-080806 A | 3/1996 |
| JP | 2004074882 A | 3/2004 |
| JP | 2008006847 A | 1/2008 |

* cited by examiner

SAFETY BELT DEVICE

RELATED APPLICATIONS

The present application is national phase of PCT/US2010/027386 filed Mar. 16, 2010 and claims priority from German Application Number 10 2009 015 296.2 filed Mar. 18, 2009.

The invention relates to a wind-on spindle which is mounted rotatably in a housing connected to the motor vehicle body and on which a safety belt is held with its one end, the wind-on spindle being prestressed into a wind-on position, in which the safety belt is wound on the wind-on spindle and the safety belt can be unwound from the wind-on spindle, counter to the prestress, as a result of the rotation of the latter, and the safety belt emerging from its end held on the wind-on spindle through an exit orifice out of the wind-on spindle. Safety belt devices of this type are used, for example, in automobiles. It is known to provide the wind-on spindle with a planar slot running through the latter. The safety belt can then be anchored with its end at an orifice of the slot, can run through the slot and can be led out, at the other slot orifice forming an exit orifice, into a vehicle interior.

Very high forces act upon safety belt devices of this type, particularly in the event of an impact of the automobile against an obstacle. The safety belt device must at all times withstand such forces. In order to simulate this load, safety belt devices are exposed to a pull of up to 15 kN when the safety belt is in the state unwound completely from the spindle. No component failure should in this case occur. In the completely unwound state of the belt, under the action of such force, in particular the wind-on spindles of the known devices are exposed to extremely high load. That region of the spindle to which the safety belt is anchored is especially critical. The known wind-on spindles therefore have to be of correspondingly stable design.

Thick-walled zinc diecast or aluminum diecast spindles have hitherto been used. However, such spindles are relatively cost-intensive and are of considerable weight.

Proceeding from the prior art explained, therefore, the object on which the invention is based is to provide a safety belt device of the type initially mentioned, which, as compared with the prior art, can be produced more cost-effectively and with lower weight and nevertheless at all times fulfils the safety requirements.

This object is achieved, according to the invention, by means of the subject of claim 1. Advantageous refinements are found in the dependent claims, the description and the figures.

For a safety belt device of the type initially mentioned, the invention achieves the object in that, in the state unwound completely from the wind-on spindle, the safety belt runs, between its end held on the wind-on spindle and the exit orifice of the wind-on spindle, in a sheet-like manner over at least one surface.

The safety belt device according to the invention may be provided, for example, for an automobile. The safety belt is anchored with its one end on the wind-on spindle. The prestress of the wind-on spindle may be provided in a way known per se, for example by a spring. Moreover, the safety belt device may in a way likewise known per se possess a blocking device with latching, which blocks the safety belt in the event of high accelerations, for example in the event of an impact of the automobile against an obstacle or if the automobile is sharply inclined, so that a passenger is retained by the belt. Furthermore, the safety belt device may have a torsion bar which twists under high forces acting on the device and thus absorbs part of the energy.

According to the invention, in the completely unwound state, the safety belt is guided in a sheet-like manner over at least one surface. During guidance over the surface, a deflection in the direction of the belt may take place. When it is stated, in this context, that the safety belt runs in a sheet-like manner over at least one surface, this means that the belt bears in a sheet-like manner on this surface, that is to say is in sheet-like frictional contact with the surface. According to the invention, the frictional surface thus formed is provided between the anchoring of the belt end and the exit orifice of the spindle and forms a looping surface for the belt. The exit orifice in this case designates the last exit orifice from the spindle in the unwinding direction of the belt, before the latter leaves the housing and is led into the vehicle interior. It is, of course, possible that the belt previously also runs through a further exit (and reentry) orifice in the wind-on spindle. It is critical merely that, between the belt end anchored on the spindle and the last exit orifice, at least one frictional surface is provided, against which the belt bears in the completely unwound state.

The force acting on the safety belt device under load is partially absorbed via the frictional surface. As a result, the forces acting in the especially critical region of the anchoring of the belt end to the spindle also diminish. The stability requirements demanded of the wind-on spindle are therefore lower, while it withstands at all times the sometimes extremely high loads. According to the invention, in addition to thinner and therefore lighter wind-on spindles, plastics may also be considered as a material for the wind-on spindle. As a result, the safety belt device becomes more cost-effective and possesses a markedly lower weight than conventional devices.

At the same time, the device according to the invention can be mounted largely in the same way as known devices of this type. This is of critical importance precisely with regard to the safety-relevant components present, since any variation in design or mounting has to be tested and cleared for operation.

In an especially practical way, the at least one surface may be a surface of the wind-on spindle, in particular an outer face of the wind-on spindle. This refinement is distinguished by a low outlay in structural terms, since the wind-on spindle has to be varied only slightly in structural terms, as compared with known spindles. It is also possible that the at least one surface is formed by a casing layer applied to an outer face of the wind-on spindle. Such a casing may, for example, consist of a plastic material which then forms the outer face against which the belt bears. The casing face may consist of a material which affords a particularly high coefficient of friction upon friction with the safety belt material. The load undergone by the spindle is thereby further reduced. According to a further refinement, the at least one surface may be curved, for example circularly curved. By means of the curvature, the frictional surface can be adapted optimally to the profile of the belt, so that an especially large-area and uniform frictional contact occurs. Insofar as the belt is guided over the, in particular, cylindrical outer face of the spindle or a corresponding casing face, the belt can be guided in the circumferential direction, in particular, over at least one quarter of the circumference of the spindle.

According to a further especially practical refinement, at least one slot with an entry orifice and with the exit orifice may run inside the wind-on spindle, the safety belt running through the slot. The belt therefore runs through the entry orifice into the slot, through the latter and out of this again through the exit orifice. The slot may be of essentially planar design or may have a curvature. The slot or slots may, in particular, run through a wall of the, for example, cylindrical wind-on spindle. It is then conceivable, according to a further refinement, that the at least one surface is a surface laterally delimiting the at least one slot. In this case, it is also possible that the safety belt runs both on an outer face of the wind-on spindle (or a corresponding casing face) and on an inner wall of the slot.

According to a further refinement, in the state unwound completely from the wind-on spindle, the safety belt may run first, starting from its end held on the wind-on spindle, through a first slot in the wind-on spindle, subsequently run over the at least one surface and, thereafter, run through a second slot in the wind-on spindle. The belt then runs through the exit orifice formed, in particular, by the second slot out of the spindle. The safety belt therefore emerges from the first slot, runs further on over the, for example, curved outer surface of the wind-on spindle and subsequently enters the second slot. When it emerges from the first slot and when it enters the second slot, the belt may in each case be deflected, for example through more than 60°, in particular through about 90°. The spindle may in this case have, in particular, only the first and second slot. The first and second slot may run parallel to one another. An especially uniform load upon the spindle is thereby achieved.

In a further refinement, in the state unwound completely from the wind-on spindle, the safety belt may first run, starting from its end held on the wind-on spindle, over the at least one surface and subsequently run through at least one slot in the wind-on spindle. The belt then runs through the exit orifice, which may again be formed by the slot, out of the spindle. In this refinement, this slot may be the only slot in the spindle. In this refinement, the belt therefore runs, starting from its anchoring, first over the frictional surface and subsequently through the slot. Once again, the frictional surface may, for example, be a curved (outer) face of the wind-on spindle.

For anchoring on the wind-on spindle, the safety belt may possess at its end held on the wind-on spindle a loop, through which is led a bolt which is held in a receptacle of the wind-on spindle. When the safety belt is subjected to tensile load in the unwinding direction, the bolt then bears against a corresponding bearing face of the wind-on spindle. The bolt and consequently the safety belt are thereby held reliably.

Since the wind-on spindle is subjected according to the invention to a reduced load, it may consist at least partially, in particular completely, of a plastic. For example, polymers, such as polyamide, may be considered. The spindle and therefore the safety belt device can thus be produced especially cost-effectively and at the same time are of low weight. It is also possible to manufacture the wind-on spindle from different plastics which are built up as a two-component part, for example, by means of a plastic injection molding operation. In this case, the portions subjected to high load under the action of force may be formed from an especially load-bearing plastic, for example polyamide, while the remaining portions are produced from a less load-bearing cost-effective plastic, for example polypropylene. It is, of course, possible to form, for example, a latching of a blocking device of the safety belt device from metal. It is, of course, likewise also conceivable that the wind-on spindle consists at least partially, in particular completely, of an aluminum material or of another metal material.

Figure 2:
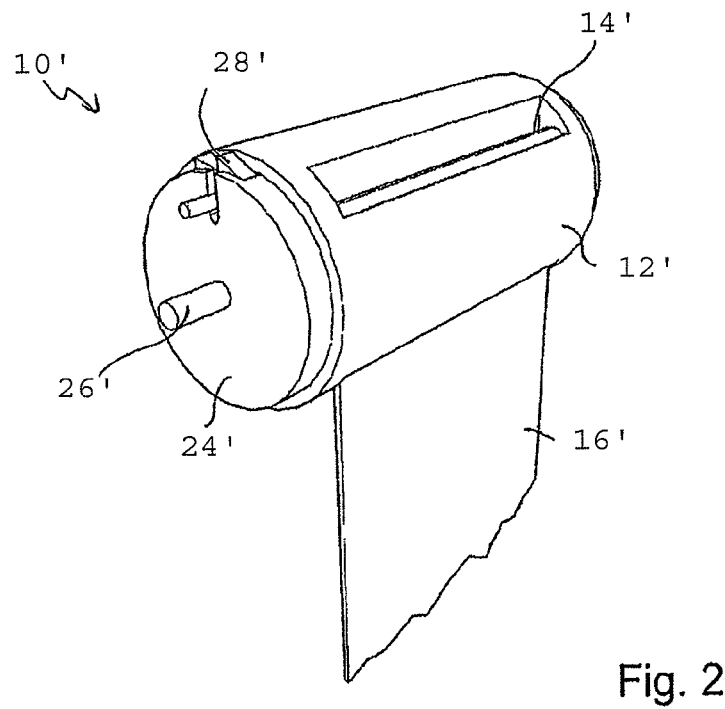
Figure 3:
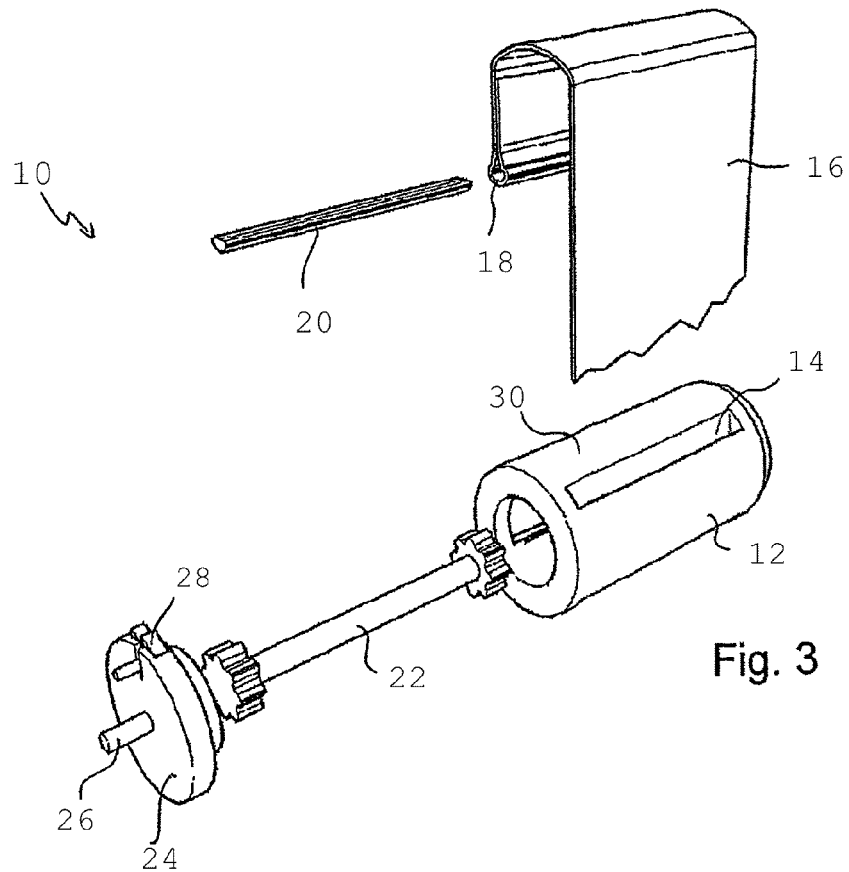
Figure 4:
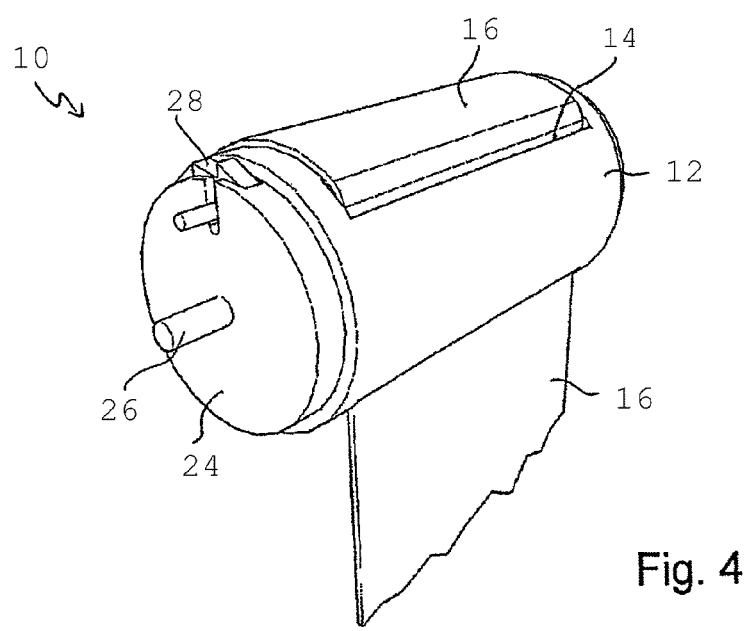
Figure 5:
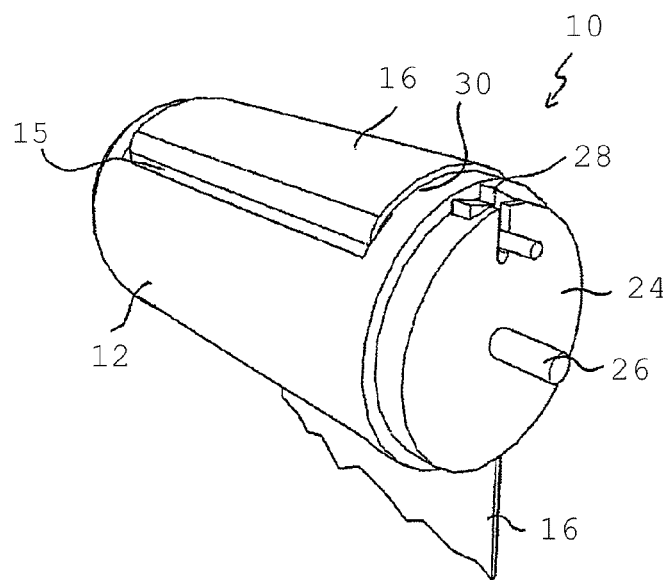
Figure 6:
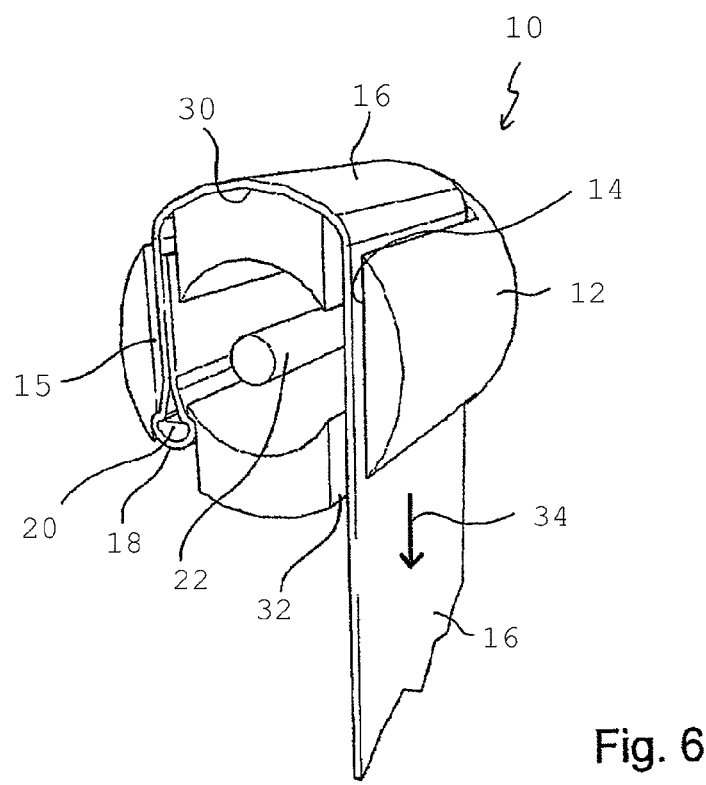
Figure 7:
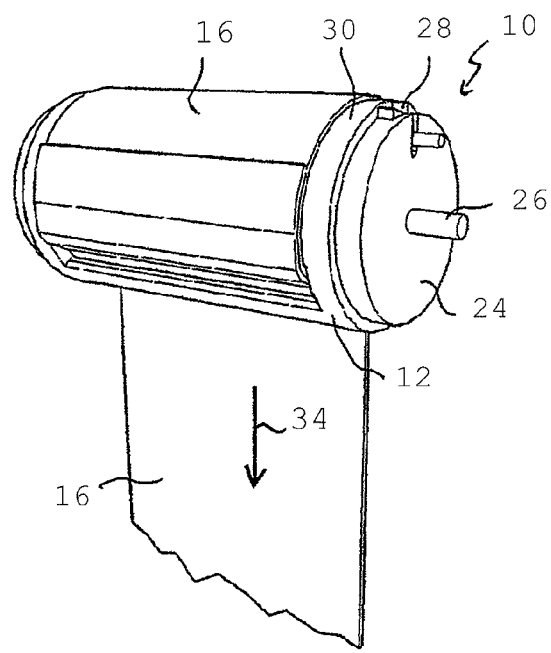
Figure 8:
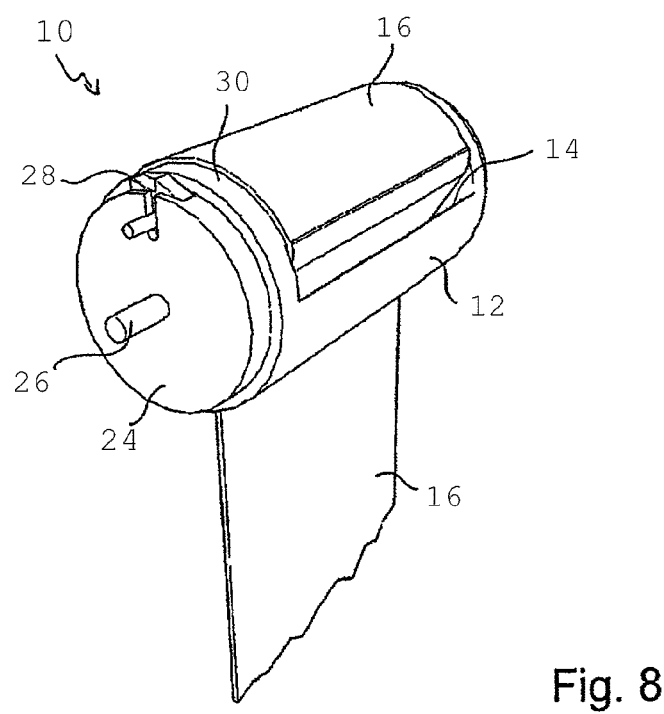
Figure 9:
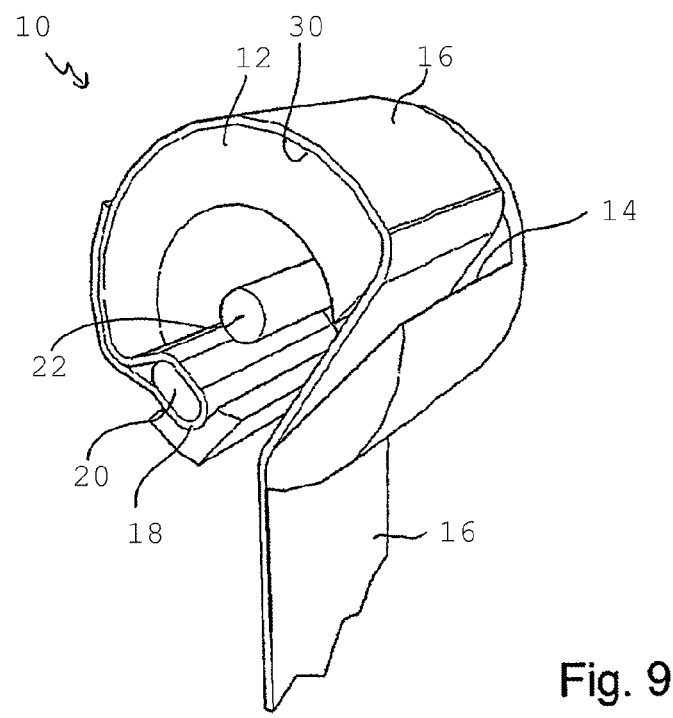
Figure 10:
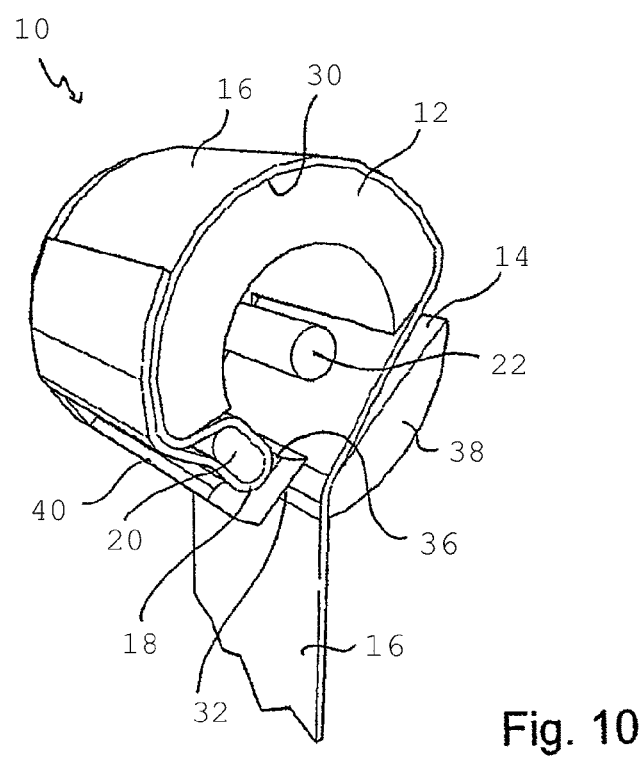

An exemplary embodiment of the invention is explained in more detail below with reference to the figures in which, diagrammatically:

FIG. 1 shows a safety belt device according to the prior art in a perspective exploded illustration, FIG. 2 shows the safety belt device from FIG. 1 in the mounted state in a perspective view, FIG. 3 shows a safety belt device according to the invention in a perspective exploded illustration, FIG. 4 shows the safety belt device from FIG. 3 in the mounted state in a perspective view, FIG. 5 shows the safety belt device from FIG. 4 in a further perspective view, FIG. 6 shows the safety belt device from FIG. 4 in a perspective sectional view, FIG. 7 shows a safety belt device according to the invention in a further exemplary embodiment in a perspective view, FIG. 8 shows the safety belt device from FIG. 7 in a further perspective view, FIG. 9 shows the safety belt device from FIG. 7 in a perspective sectional view, and FIG. 10 shows the safety belt device from FIG. 7 in a further perspective sectional view.

Unless specified otherwise, identical reference symbols designate the same objects in the figures. FIGS. 1 and 2 show a safety belt device 10' according to the prior art. A wind-on spindle 12' which possesses essentially a hollow-cylindrical shape can be seen in the exploded illustration in FIG. 1. In the example illustrated, the spindle 12' is a zinc diecast spindle. It possesses a planar slot 14' which runs through the wind-on spindle 12' and of which the upper orifice can be seen in FIGS. 1 and 2. What can be seen, furthermore, is a safety belt 16' which has at one end a loop 18' into which a bolt 20' is introduced. In the mounted state shown in FIG. 2, the safety belt 16', together with the bolt 20', is held on a corresponding bearing face in the region of the entry orifice of the slot 14' and is consequently anchored. As can be seen, further, in FIG. 2, the safety belt 16' emerges from the slot 14' through the lower exit orifice of the latter. The safety belt device 10' possesses, further, a torsion bar 22' mounted in a way known per se inside the spindle 12'. In the mounted state, the end face, open in FIG. 1, of the wind-on spindle 12' is closed by means of a bearing element 24' with bearing bolts 26'. The wind-on spindle 12' is mounted rotatably inside a housing, not illustrated in any more detail. In this case, the spindle 12' is prestressed by a spring, not illustrated in any more detail, into a wind-on position in which the safety belt 16' is wound on the spindle. The belt can be brought by a pull, counter to the prestress of the spring, into the completely unwound position shown in the figures. A toothing element 28' arranged in the bearing element 24' is part of a blocking device, not illustrated in any more detail, which blocks the rotational movement of the spindle 12' in the event of high accelerations acting on the belt. The set-up of a safety belt device shown in FIGS. 1 and 2 is known per se. Further explanation relating to this is therefore dispensed with.

FIGS. 3 to 6 illustrate a safety belt device 10 according to the invention in a first exemplary embodiment. This largely corresponds in its basic set-up to the safety-belt device 10' from FIGS. 1 and 2. In particular, the safety belt device 10 according to the invention also possesses an essentially cylindrical wind-on spindle 12. Once again, a torsion bar 22 is mounted inside the wind-on spindle 12, and the wind-on spindle 12 is closed on its open end face, shown in FIG. 3, by a bearing element 24 with bearing bolts 26. Such a bearing element with bearing bolts is likewise provided on the opposite side of the wind-on spindle 12. The wind-on spindle 12 is once again mounted rotatably in a housing, not illustrated in any more detail, and is prestressed into the wind-on position by a spring. Moreover, once again, a toothing element 28, as part of a blocking device, not illustrated in any more detail, of the safety belt device 10 is inserted into the bearing elements 24.

In the example illustrated, the torsion bar 22, the bearing elements 24, including the bearing bolts 26, and the toothing elements 28 consist of a metal material, for example a steel material. In contrast to conventional spindles, however, the wind-on spindle 12 according to the invention consists of a plastic material. This is possible because of the special configuration of the wind-on spindle 12 according to the invention. As can be seen, for example, in the sectional view in FIG. 6, the wind-on spindle 12 possesses two planar slots 14 and 15 running parallel to one another through the cylinder wall of the wind-on spindle 12. The first slot 15 possesses, at its lower end in the figures, a widened orifice, into which the safety belt 16 can be inserted with its loop 18 and with the bolt 20 led through this, as can be seen in FIG. 6. The slot 15 narrows from the widening in such a way that the bolt 20 and therefore the safety belt 16 are anchored in the orifice of the slot 15 against upward movement in FIG. 6.

As can likewise be seen in FIG. 6, the safety belt 16 runs from its anchoring through the first slot 15 and out through the upper exit orifice and is then deflected through about 90°. Subsequently, the belt 16 is guided over the upper curved outer face 30 of the wind-on spindle 12. In this case, the safety belt 16 is guided, in particular, over about one quarter of the circumference of the wind-on spindle 12. The safety belt 16 is then led through the upper entry orifice of the second slot 14 into the latter and through this to its lower exit orifice 32. For entry into the second slot 14, the safety belt 16 is again deflected through about 90°. Subsequently, the safety belt 16 emerges through the lower exit orifice 32 of the second slot 14. In the state unwound completely from the wind-on spindle 12, as shown in FIGS. 4 to 6, the safety belt 16 bears in a sheet-like manner on the outer face 30 of the spindle 12. If, then, a pull is exerted on the safety belt 16 in the unwinding direction of the latter, as illustrated in FIG. 6 by the arrow 34, part of this force is absorbed due to the frictional contact between the underside of the safety belt 16 and the surface 30 of the wind-on spindle 12. The force acting on the anchoring, formed by the loop 18 and the bolt 20, of the safety belt 16 on the spindle 12 is correspondingly lower. It is thereby possible to produce the wind-on spindle 12 from a plastic material, without the safety of the belt device being impaired. The first and second slots 15, 14 may in this case run essentially parallel to the force acting along the arrow 34 on that end of the safety belt 16 which emerges from the exit orifice 32. However, under tensile load according to the arrow 34, a slight rotation of the spindle 12 clockwise out of the position shown in FIGS. 5 and 6 may occur. It is therefore possible that there is an acute angle between the direction of pull and the slots.

FIGS. 7 to 10 show a further exemplary embodiment of a safety belt device 10 according to the invention. This largely corresponds to the safety belt device 10 shown in FIGS. 3 to 6. In contrast to the safety belt device 10 from FIGS. 3 to 6, however, the safety belt device 10 in FIGS. 7 to 10 possesses only one slot 14. As can be seen particularly in FIGS. 9 and 10, the safety belt 16 is once again anchored in a receptacle 36 of the wind-on spindle 12 by means of the bolt 20 led through its loop 18. In this exemplary embodiment, however, in the state unwound completely from the spindle 12, as illustrated, the safety belt 16 is first guided from this anchoring over the curved outer surface 30 of the wind-on spindle 12 as far as the upper entry orifice of the slot 14. In this case, in this example, the safety belt 16 is guided over about half of the circumference of the wind-on spindle 12. Subsequently, the safety belt 16 runs via the entry orifice through the slot 14 and through the exit orifice 32 out of the slot 14. The slot 14 may in this case run nonparallel to the force acting, according to the arrow 34 shown by way of example in FIG. 7, on that end of the safety belt 16 which emerges from the exit orifice 32. In the embodiment according to FIGS. 7 to 10, the frictional surface provided for reducing the action of force can be maximized further, so that the stability requirements demanded of the wind-on spindle 12 can be further reduced, while at the same time the safety requirements are adhered to.

Although not illustrated in the figures, it is also possible to arrange on the outer surface 30 of the wind-on spindle 12 a casing layer, over which the safety belt 16 is guided. By a suitable choice of material, an especially high coefficient of friction can be generated between the belt and casing face, and therefore the force-reducing action of the frictional surface can be optimized. Moreover, it is conceivable, for example in the example shown in FIGS. 7 to 10, to produce the wind-on spindle 12 as a two-component part from different plastics, for example by means of an injection molding method. In this case, highly loaded portions, such as, for example, the wall portion 38 providing the slot 14 and/or the portion 40 providing the receptacle 36, may be manufactured from a plastic having a higher load-bearing capacity than remaining portions of the spindle 12.

The safety device according to the invention is therefore distinguished, as compared with conventional safety devices, by a more cost-effective production and a lower weight, the safety requirements placed upon such devices being fulfilled at all times.

The invention claimed is:

1. A motor vehicle safety belt device, comprising:
a wind-on spindle which is mounted rotatably in a housing configured to be connected to a motor vehicle body; and
a safety belt that passes through a passage through the wind-on spindle, wherein one end of the safe belt is looped about a pin, and wherein a first surface of the wind-on spindle and a second surface of the wind-on spindle abut the looped portion, thereby defining a held end of the safety belt, wherein
the first surface and the second surface are located on opposite sides of the belt,
the wind-on spindle is prestressed into a wind-on position, in which the safety belt is wound on the wind-on spindle and the safety belt is unwindable from the wind-on spindle, counter to the prestress, as a result of the rotation of the latter,
the safety belt emerges out of the wind-on spindle through an exit orifice, and
in the state unwound completely from the wind-on spindle, the safety belt runs, between its looped end and the exit orifice of the wind-on spindle, in a sheet-like manner over at least one surface of the wind-on spindle,
wherein the wind-on spindle includes a first passage section through which the belt extends from the pin, wherein the passage is open to an internal portion of the wind-on spindle, the internal portion being at about the center of the wind-on spindle relative to a longitudinal axis of the wind-on spindle.

2. The safety belt device as claimed in claim 1, wherein the wind-on spindle defines at least one slot with an entry orifice and with the exit orifice therethrough, and the safety belt runs through the slot.

3. The safety belt device as claimed in claim 1, wherein, in the state unwound completely from the wind-on spindle, the safety belt runs first, starting from its end held on the wind-on spindle, through a first slot in the wind-on spindle, subsequently runs over at least one outer surface of the wind-on spindle and, thereafter, runs through a second slot in the wind-on spindle.

4. The safety belt device as claimed in claim 3, wherein the first and second slots run parallel to one another.

5. The safety belt device as claimed in claim 1, wherein the safety belt possesses at its end held on the wind-on spindle a loop, through which is led a bolt which is held in a receptacle of the wind-on spindle.

6. The safety belt device as claimed in claim 1, wherein the wind-on spindle consists at least partially of a plastic.

7. The safety belt device as claimed in claim 1, wherein the wind-on spindle consists at least partially of an aluminum material.

8. The safety belt device as claimed in claim 1, wherein the first and second surfaces are part of a monolithic component.

9. The safety belt device as claimed in claim 8, wherein the first and second surfaces are established by plastic elements.

10. The safety belt device as claimed in claim 9, wherein the first and second surfaces are bearing elements that resist movement of the belt induced by tension on the belt.

11. The safety belt device as claimed in claim 1, wherein the first and second surfaces are established by plastic elements.

12. The safety belt device as claimed in claim 11, wherein the first and second surfaces are bearing elements that resist movement of the belt induced by tension.

13. The safety belt device as claimed in claim 1, wherein the belt device is configured such that a portion of the device is such that no component other than the wind-on spindle is located between a side of the belt and a torsion bar of the belt.

14. The safety belt device as claimed in claim 1, wherein the pin has a "D" shaped cross-section.

* * * * *